(12) United States Patent
Shirafuji

(10) Patent No.: US 12,704,926 B2
(45) Date of Patent: Aug. 11, 2026

(54) ELECTRONIC APPARATUS

(71) Applicant: KYOCERA Document Solutions Inc., Osaka (JP)

(72) Inventor: Shigetoshi Shirafuji, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 18/984,899

(22) Filed: Dec. 17, 2024

(65) Prior Publication Data

US 2025/0208735 A1 Jun. 26, 2025

(30) Foreign Application Priority Data

Dec. 21, 2023 (JP) ................................ 2023-215531

(51) Int. Cl.
*G06F 3/041* (2006.01)
*G06F 3/04886* (2022.01)

(52) U.S. Cl.
CPC ........ *G06F 3/0418* (2013.01); *G06F 3/04886* (2013.01); *G06F 2203/04803* (2013.01)

(58) Field of Classification Search
CPC ............... G06F 3/0418; G06F 3/04886; G06F 2203/04803
USPC .................................................. 345/173–174
See application file for complete search history.

(56) References Cited

U.S. PATENT DOCUMENTS 11,435,899 B1 * 9/2022 Michaels .............. G06F 3/0485
2005/0275637 A1 * 12/2005 Hinckley ............ G06F 3/03543 345/173
2013/0050118 A1 * 2/2013 Kjelsbak ................ G06F 3/017 345/173
2016/0012465 A1 * 1/2016 Sharp .................. G06Q 20/321 705/14.17
2017/0149990 A1 5/2017 Saito
2019/0138113 A1 * 5/2019 D ........................ G06F 3/04886
2022/0222047 A1 * 7/2022 Todirel .................... G06F 9/453
2023/0116149 A1 * 4/2023 Radhakrishna ........... G06F 8/33 717/110

FOREIGN PATENT DOCUMENTS

JP 2009-020554 1/2009

* cited by examiner

*Primary Examiner* — Kwin Xie

(57) ABSTRACT

An electronic apparatus includes a display device, a touch panel, and a panel control unit. The display device is configured to display an operation screen. The touch panel is configured to detect an operation to the operation screen. The panel control unit is configured to perform transition of the operation screen in accordance with the detected operation. Further, if the operation to go back along the transition is detected with a predetermined frequency or more, the panel control unit displays on the operation screen a first soft key to indicate misrecognition of the touch panel.

3 Claims, 4 Drawing Sheets

ELECTRONIC APPARATUS

CROSS-REFERENCE TO RELATED APPLICATIONS

This application relates to and claims priority rights from Japanese Patent Application No. 2023-215531, filed on Dec. 21, 2023, the entire disclosures of which are hereby incorporated by reference herein.

BACKGROUND

1. Field of the Present Disclosure

The present disclosure relates to an electronic apparatus.

2. Description of the Related Art

An operation assist display device includes an operation propriety determination unit that determines whether an operation to be performed for a user-desired process is performed or not (i.e. operation propriety), and determines whether display is performed of a help function to assist an operation performed by a user or not on the basis of a determination history of operation propriety in the past.

However, if a touch panel that receives a user operation has malfunction, the touch panel misrecognizes a user operation regardless that the user correctly performs the operation, and consequently a wrong user operation is inputted, then the aforementioned help function for operation assist is useless because the user correctly performs the operation.

SUMMARY

An electronic apparatus according to an aspect of the present disclosure includes a display device, a touch panel, and a panel control unit. The display device is configured to display an operation screen. The touch panel is configured to detect an operation to the operation screen. The panel control unit is configured to perform transition of the operation screen in accordance with the detected operation. Further, if the operation to go back along the transition is detected with a predetermined frequency or more, the panel control unit displays on the operation screen a first soft key to indicate misrecognition of the touch panel.

These and other objects, features and advantages of the present disclosure will become more apparent upon reading of the following detailed description along with the accompanied drawings.

DETAILED DESCRIPTION

Hereinafter, an embodiment according to an aspect of the present disclosure will be explained with reference to drawings.

Figure 1:
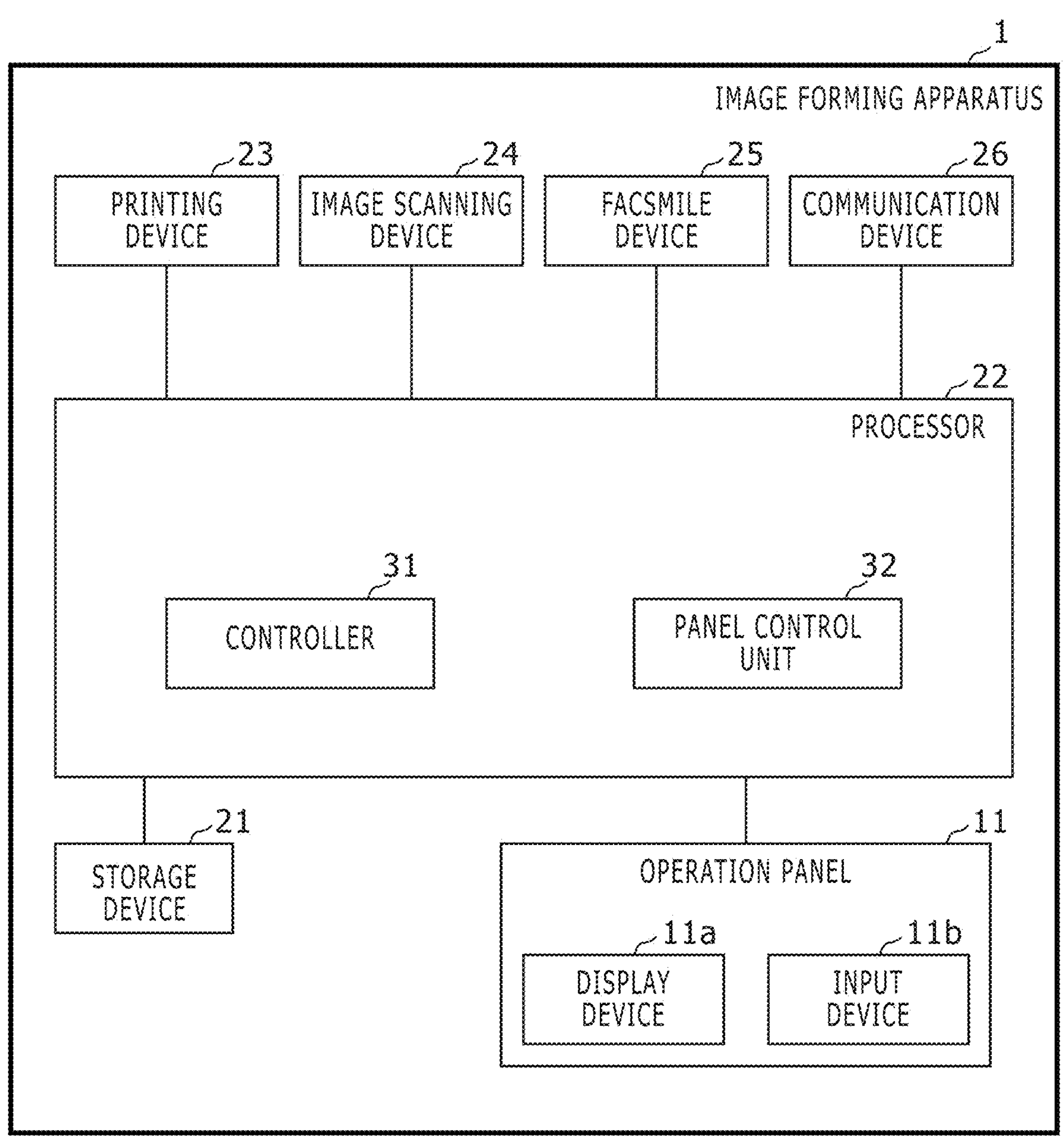
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. The image forming apparatus shown in FIG. 1 is an electronic apparatus such as a copier or a multi function peripheral. As shown in FIG. 1, the image forming apparatus 1 includes an operation panel 11, a storage device 21, a processor 22, a printing device 23, an image scanning device 24, a facsimile device 25, a communication device 26, and the like.

Figure 2:
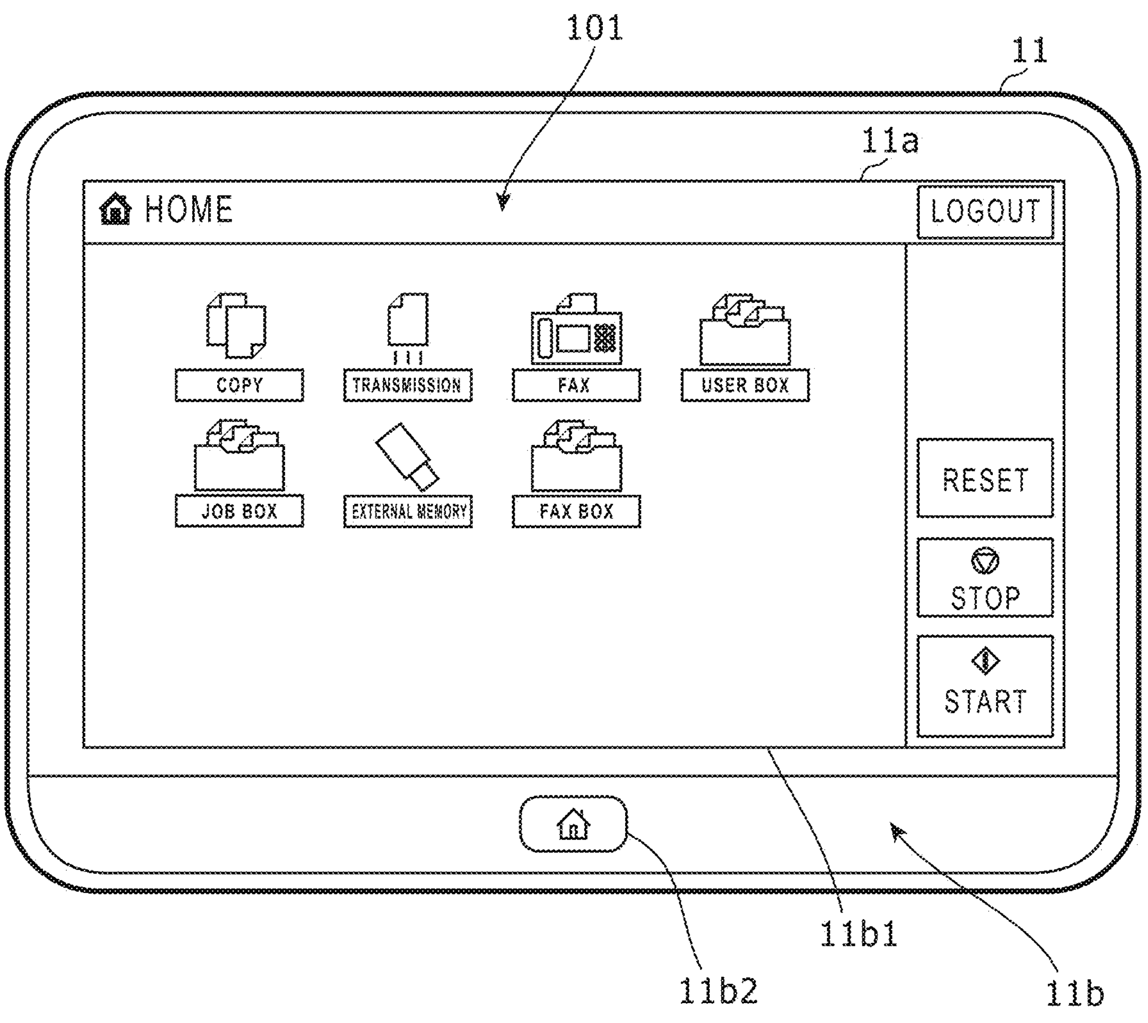
FIG. 2 shows a diagram that indicates an example of an operation panel 11 shown in FIG. 1.

FIG. 2 shows a diagram that indicates an example of an operation panel 11 shown in FIG. 1. The operation panel 11 is arranged on a front side of a housing of the image forming apparatus 1, and as shown in FIG. 2, for example, includes a display device 11*a* such as a liquid crystal display and an input device 11*b* such as a touch panel 11*b*1 and a hard key 11*b*2. The display device 11*a* displays sorts of operation screens to a user. A soft key is embodied by the touch panel and a key image displayed on the display device 11*a*. The input device 11*b* detects a user operation to an operation screen (a soft key or the like) using the touch panel 11*b*1 and detects a user operation to the hard key 11*b*2 when such user operation is inputted by a user. The hard key 11*b*2 shown in FIG. 2 is a key to change an operation screen to a home screen 101.

Returning to FIG. 1, the storage device 21 is a nonvolatile rewritable storage device such as a flash memory.

The processor 22 is a computer that includes a CPU (Central Processing Unit), a ROM (Read Only Memory), a RAM (Random Access Memory) and the like, and loads a program to the RAM from the storage device 21 or the ROM and executes the program using the CPU and thereby acts as sorts of processing units. Here, the processor 22 acts as a controller 31 and a panel control unit 32.

The printing device 23 performs printing of an image specified by a job request in accordance with the job request such as a print job request or a copy job request by a user operation.

Further, for example, the image scanning device 24 includes an automatic document feeder, and in accordance with a copy job request or the like based on a user operation, causes the automatic document feeder to transport a document sheet put on the automatic document feeder, optically scans a document image of the document sheet, and generates image data of the document image.

Furthermore, the facsimile device 25 generates and transmits a facsimile signal of an image specified by a facsimile transmission job request based on a user operation in accordance with the facsimile transmission job request, and receives a facsimile signal from an external device and generates image data from the received facsimile signal. The communication device 26 such as wireless or wired interface performs data communication with an external device.

The controller 31 controls internal devices such as the printing device 23, the image scanning device 24, the facsimile device 25, and the communication device 26, and performs a job (print, scan, copy, send or the like) specified by a job request.

Figure 3:
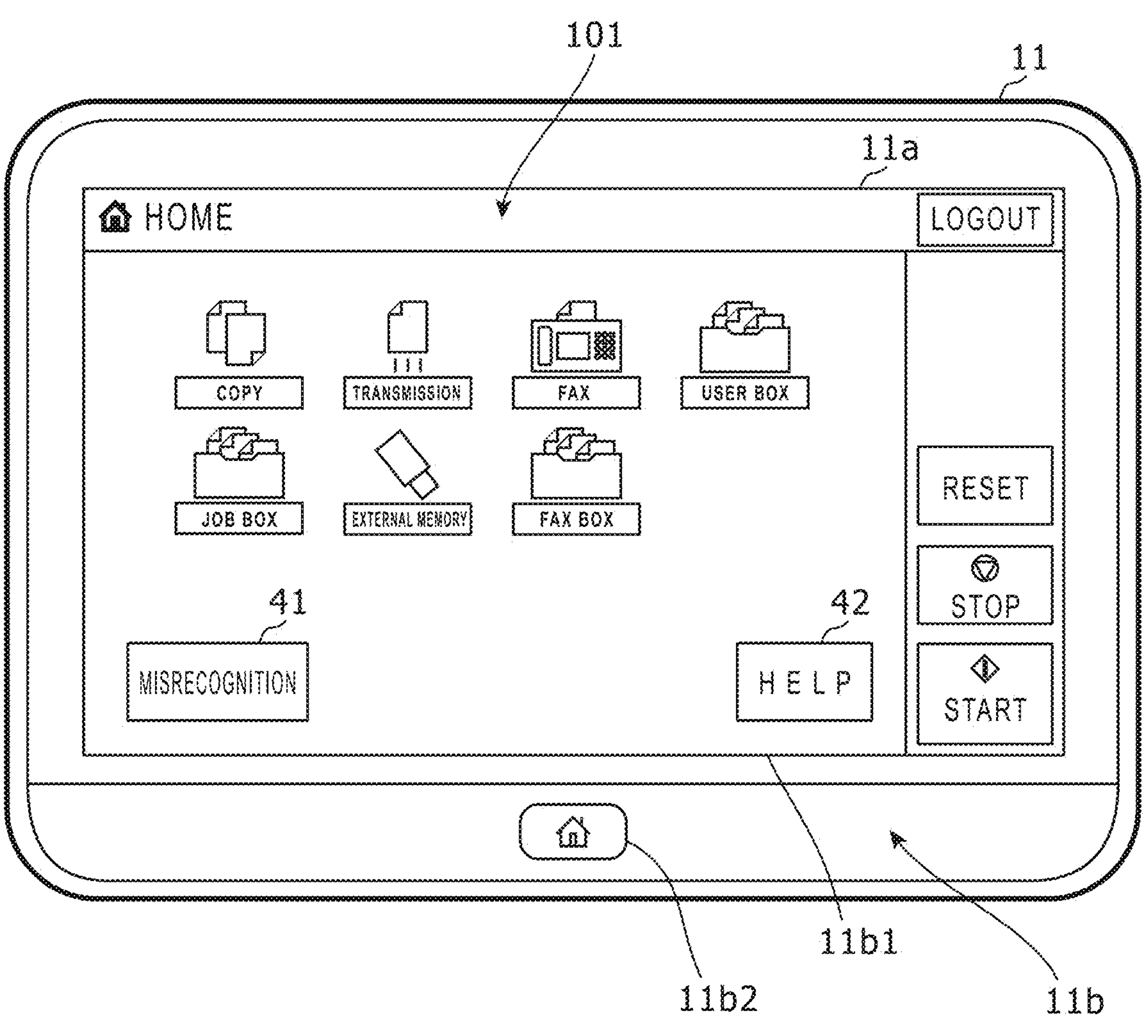
FIG. 3 shows a diagram that indicates an example of a misrecognition key and a help key displayed when many operations are performed to go back along screen transition.

FIG. 3 shows a diagram that indicates an example of a misrecognition key and a help key displayed when many operations are performed to go back along screen transition. The panel control unit 32 performs transition of an operation screen displayed on the display device 11*a* in accordance with a user operation detected by the input device 11*b*. Further, if the user operation to go back along the screen transition is detected with a predetermined frequency or more, the panel control unit 32 displays on the operation screen a misrecognition key 41 (soft key) to indicate misrecognition of the touch panel 11*b*1 as shown in FIG. 3, for example.

Here, the "user operation to go back along the screen transition" is pressing the hard key 11*b*2 to return to the home screen (initial screen), pressing a "return" key (not shown) to return a previous operation screen in the operation screen, or the like. Further, for example, the aforementioned predetermined frequency is set as 5 times per most recent 30 seconds, or the like.

When the user feels this operation was performed due to misrecognition of the touch panel 11*b*1 rather than due to his/her own misoperation, the user presses this misrecognition key 41.

Further, in accordance with a frequency that the misrecognition key 41 is displayed and pressed, the panel control unit 32 performs at least one of (a) display of a message that indicates malfunction of the touch panel 11*b*1 and (b) notification of malfunction of the touch panel 11*b*1 to a customer support.

For example, if pressing the misrecognition key 41 is detected 6 times per most recent 10 times of displaying the misrecognition key 41, the aforementioned message display and/or the notification of the malfunction are/is performed.

For example, if the image forming apparatus 1 is not connected to a network, performed are display of a message to indicate malfunction of the touch panel 11*b*1 (for example, "The touch panel may have malfunction. Please call a service person." or the like) and display of contact information of a service person.

For example, if the image forming apparatus 1 is connected to a network, performed are display of a message to indicate malfunction of the touch panel 11*b*1 (for example, "The touch panel may have malfunction. Status information of the apparatus should be transmitted to the customer support." or the like) and transmission of the status information (operation history or the like) of the apparatus to the customer support (i.e. notification of malfunction of the touch panel 11*b*1).

For example, if the image forming apparatus 1 is connected to a network and remote access is allowed to the customer support, then after the notification of the malfunction of the touch panel 11*b*1 as mentioned, a message is displayed such as "Do you request a touch panel operation through remote access by the customer support?". When the user sees the message, the user requests to the customer support by email or the like a touch panel operation from remote. The customer support performs a touch panel operation from remote (for example, an operation to a remote panel), and causes the image forming apparatus 1 to perform a user-desired process.

Further, if the user operation to go back along the screen transition is detected with a predetermined frequency or more, the panel control unit 32 displays on the operation screen a help key 42 to provide a help function together with the misrecognition key 41 as shown in FIG. 3, for example. When the help key 42 is pressed, a help function is invoked.

Figure 4:
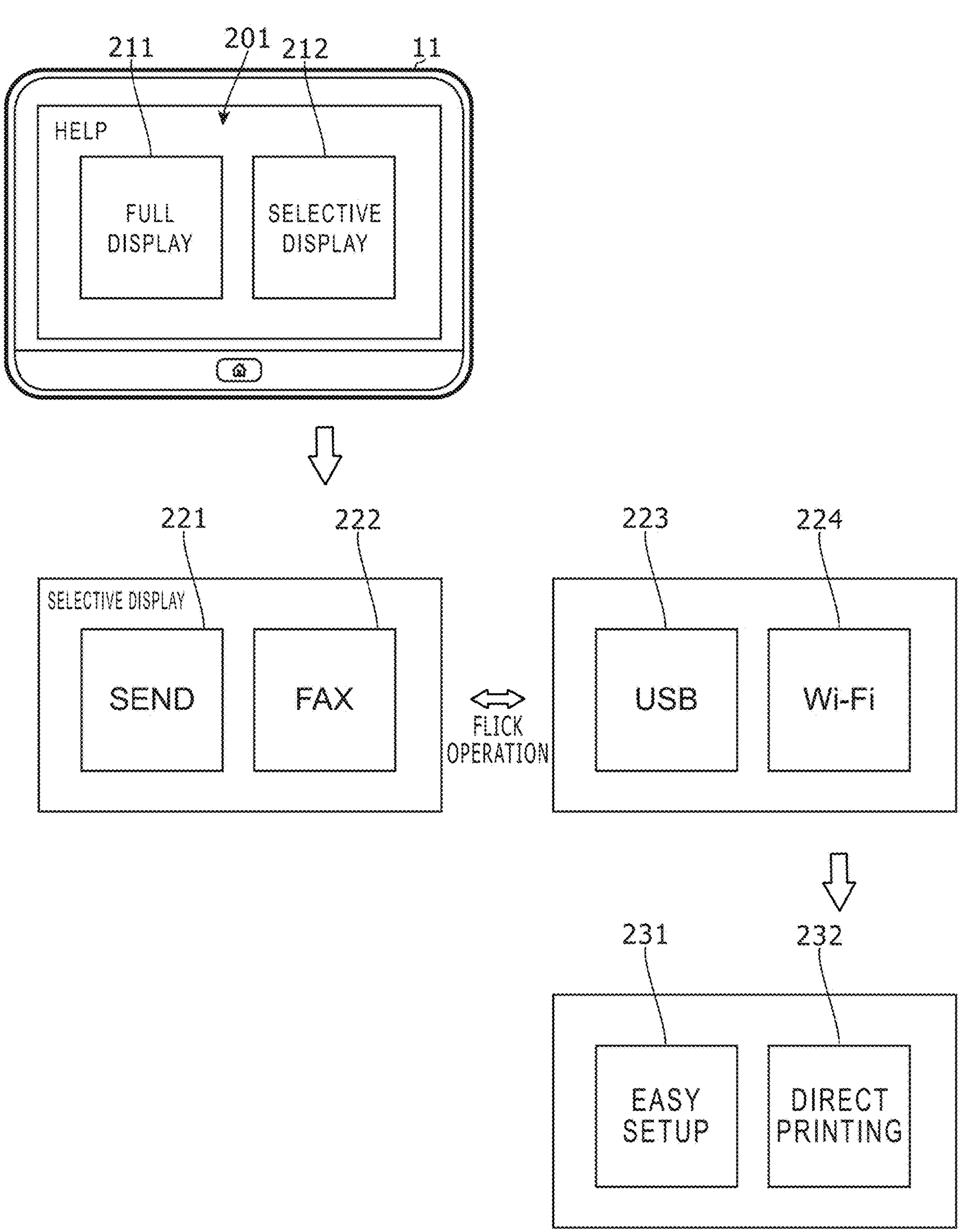
FIG. 4 shows a diagram that indicates an example of a menu of a help function.

FIG. 4 shows a diagram that indicates an example of a menu of the help function. As shown in FIG. 4, for example, the panel control function 32 (a) in the help function, displays on the display device 11*a* a list of items classified into functions, and (b) displays the list except for other items than a function corresponding to the operation screen that the operation to go back along the transition is performed (i.e. except for other items than a function that may have malfunction).

For example, when the help key 42 is pressed, the panel control unit 32 display a help initial screen 201. The help initial screen 201 includes a full display key 211 and a selective display key 212. The full display key 211 is a soft key to select an ordinary help function (displaying a list not except for the aforementioned items). The selective display key 212 is a soft key to select displaying a list except for the aforementioned items.

When the selective display key 212 is pressed, a list of function selection keys 221 to 224 is displayed. Here, items in the list (the function selection keys 221 to 224) are displayed two by two, switched in accordance with a flick operation or the like.

For example, if a function that may have malfunction is a network connection function, the function selection keys 221 to 224 of related functions (send, fax, USB and Wi-Fi) are displayed, but a function selection key of an unrelated function (copy or the like) is not displayed. The function selection keys 221 to 224 are displayed in a decreasing order of numbers of views on the basis of a browsing history or the like of the help function.

Here, when the function selection key 224 of Wi-Fi is pressed, function selection keys 231, 232 are displayed as minor items of the selected item (Wi-Fi). Further, when one of the function selection keys 231, 232 is pressed, support information corresponding to the pressed function selection key 231 or 232 is displayed (such as information for malfunction determination or information for resolving the malfunction).

The following part explains a behavior of the aforementioned image forming apparatus 1.

When the image forming apparatus 1 starts or when a user logs in, the panel control unit 32 displays a home screen (initial screen) on the display device 11*a* as shown in FIG. 2, for example.

The user performs an operation (clicking of an icon or the like) to the home screen to select a desired function. When such operation is detected by the input device 11*b*, the panel control unit 32 displays an operation screen of the function on the display device 11*a*. Operation screens of each function are hierarchically configured; in each operation screen, a "return" key is arranged; and when pressing the "return" key, the user returns to a previous operation screen.

The user inputs sorts of information to the operation screen, and after checking that the inputted information is not wrong, the user performs an operation to perform the function. Contrarily, if the inputted information is not what the user intends, the user redoes input of information. Therefore, the user performs a user operation to go back along the screen transition as mentioned.

The panel control unit 32 watches whether such user operation to go back along the screen transition is detected with a predetermined frequency or more; and if a user operation to go back along the screen transition is detected with the predetermined frequency or more, then the panel control unit 32 displays the misrecognition key 41 placed on the operation screen as shown in FIG. 3, for example.

When the user feels the operation was performed due to misrecognition of the touch panel 11*b*1 rather than due to his/her own misoperation, the user presses this misrecognition key 41. Further, in accordance with a frequency that the misrecognition key 41 is displayed and pressed, the panel control unit 32 performs at least one of (a) display of a message that indicates malfunction of the touch panel 11*b*1 and (b) notification of malfunction of the touch panel 11*b*1 to a customer support, as mentioned.

Furthermore, if the user operation to go back along the screen transition is detected with a predetermined frequency or more, the panel control unit 32 displays on the operation screen the help key 42 together with the misrecognition key 41 as shown in FIG. 3, for example. If the help key 42 is pressed, the panel control unit 32 displays a hierarchical help menu except for unrelated items as mentioned, and displays support information of the selected item.

As mentioned, in the aforementioned embodiment, the display device 11*a* displays an operation screen, and the touch panel 11*b*1 detects an operation to the operation screen. The panel control unit 32 performs transition of the operation screen in accordance with the detected operation. Further, if an operation to go back along the transition is detected with a predetermined frequency or more, the panel control unit 32 displays on the operation screen the misrecognition key 41 to indicate misrecognition of the touch panel 11*b*1.

Consequently, if it is determined that a misoperation is inputted, possibility of misrecognition due to malfunction of the touch panel 11*b*1 is proposed. Therefore, malfunction of the touch panel 11*b*1 tends to be early found and usability is gained.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An electronic apparatus, comprising:

a display device configured to display an operation screen;

a touch panel configured to detect an operation to the operation screen; and a panel control unit configured to perform transition of the operation screen in accordance with the detected operation;

wherein if the operation to go back along the transition is detected a predetermined number of times within a predetermined period of time, the panel control unit displays on the operation screen a first soft key to indicate misrecognition of the touch panel and a second soft key to provide a help function together with the first soft key; and the panel control function (a) in the help function, displays on the display device a list of items classified into functions in ranked order based on a decreasing order of numbers of views on the basis of a history of the user, and (b) displays the list except for other items than a function corresponding to the operation screen that the operation to go back along the transition is performed.

2. The electronic apparatus according to claim 1, wherein the panel control unit performs at least one of (a) display of a message that indicates malfunction of the touch panel and (b) notification of malfunction of the touch panel to a customer support, in accordance with a frequency that the first soft key is displayed and pressed.

3. The electronic apparatus according to claim 1, wherein if the operation to go back along the transition is detected with a predetermined frequency or more, the panel control unit displays on the operation screen a second soft key to provide a help function together with the first soft key; and the panel control function (a) in the help function, displays on the display device a list of items classified into functions, and (b) displays the list except for other items than a function corresponding to the operation screen that the operation to go back along the transition is performed.

* * * * *